United States Patent
Sana et al.

(10) Patent No.: US 8,713,099 B2
(45) Date of Patent: Apr. 29, 2014

(54) PUSH MECHANISM FOR EFFICIENTLY SENDING AGGREGATED DATA ITEMS TO CLIENT

(75) Inventors: Giselli Panontini De Souza Sana, Redmond, WA (US); Daniel V Kling, Redmond, WA (US); Sridhar Raman, Redmond, WA (US); Jim R Van Eaton, Redmond, WA (US); Russell L Simpson, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/602,000

(22) Filed: Aug. 31, 2012

(65) Prior Publication Data

US 2012/0331047 A1    Dec. 27, 2012

Related U.S. Application Data

(63) Continuation of application No. 12/030,836, filed on Feb. 13, 2008, now Pat. No. 8,260,864.

(51) Int. Cl.
*G06F 15/16* (2006.01)
*H04L 29/06* (2006.01)
*H04L 29/08* (2006.01)

(52) U.S. Cl.
CPC ............. *H04L 65/1069* (2013.01); *H04L 67/06* (2013.01)
USPC ............................. 709/203; 709/228; 709/231

(58) Field of Classification Search
CPC .................... H04L 65/1069; H04L 67/06
USPC ........................................................ 709/203
See application file for complete search history.

(56) References Cited

U.S. PATENT DOCUMENTS

| | | | |
|---|---|---|---|
| 5,790,790 A | 8/1998 | Smith et al. | |
| 6,167,451 A | 12/2000 | Stracke | |
| 6,473,793 B1 | 10/2002 | Dillon et al. | |
| 6,748,450 B1 | 6/2004 | Dutta | |
| 6,757,710 B2 | 6/2004 | Reed | |
| 6,947,738 B2 | 9/2005 | Skog et al. | |
| 7,076,553 B2 * | 7/2006 | Chan et al. | 709/226 |

(Continued)

OTHER PUBLICATIONS

Meixner et al, "Design and Evaluation of a Kernel-Level SCTP Implementation", Duke University, May 2001, accessed from <<http://www.cs.duke.edu/~py/paper/miscPaper/sys-sctp.tech.2001.pdf>> on Oct. 22, 2007.

(Continued)

*Primary Examiner* — Karen Tang
(74) *Attorney, Agent, or Firm* — Louise Bowman; Jim Ross; Micky Minhas

(57) ABSTRACT

A server push model for client/server communications. The push architecture operates on top of a non-push (e.g., request/response) protocol (e.g., HTTP) to combine notifications from multiple data sources (e.g., email, text messaging, etc.). The server can be a middle-tier server (or proxy) to which a single web client registers interest in one or more notification types from one or more data sources. The mid-tier server aggregates the notifications from the various data sources and delivers the notifications to the requesting client via a single "push" pipe. The web client then distributes each notification to the appropriate parts of the client user interface. A producer/consumer locking mechanism eliminates blocking threads waiting on a mutual exclusion lock. A notification throttling mechanism distinguishes different types of notifications in order to guarantee that the client is not overloaded with too much information.

20 Claims, 9 Drawing Sheets

(56) References Cited

U.S. PATENT DOCUMENTS

| | | | |
|---|---|---|---|
| 7,225,244 | B2 | 5/2007 | Reynolds et al. |
| 7,254,614 | B2 | 8/2007 | Mulligan et al. |
| 7,263,526 | B1 | 8/2007 | Busey et al. |
| 7,730,137 | B1 * | 6/2010 | Toomey .................. 709/206 |
| 2002/0194390 | A1 * | 12/2002 | Elving .................. 709/312 |
| 2004/0006638 | A1 | 1/2004 | Oberlander et al. |
| 2006/0015624 | A1 | 1/2006 | Smith et al. |
| 2006/0136920 | A1 * | 6/2006 | Nagano et al. ............. 718/100 |
| 2006/0136930 | A1 | 6/2006 | Kaler et al. |
| 2007/0198677 | A1 | 8/2007 | Ozhan et al. |

OTHER PUBLICATIONS

Mei et al., "Turning an HTTP Proxy Server into a Wireless Internet Gateway", Fu Jen Catholic University, Jul. 2000, accessed from <<http://www.isoc.org/inet2000/cdproceedings/3b/3b_1.htm>>on Oct. 22, 2007.

Just Van Den Broecke, "Pushlets—Whitepaper", Aug. 2002, accessed from <<http://www.pushlets.com/doc/whitepaper-all.html>>on Oct. 22, 2007.

* cited by examiner

PUSH MECHANISM FOR EFFICIENTLY SENDING AGGREGATED DATA ITEMS TO CLIENT

CROSS-REFERENCE TO RELATED APPLICATIONS

This application is a continuation of and claims priority to U.S. patent application Ser. No. 12/030,836 filed on Feb. 13, 2008 and issued as U.S. Pat. No. 8,260,864 on Sep. 4, 2012, which is incorporated by reference in its entirety.

BACKGROUND

Software vendors strive to provide greater application interoperability to retain and meet the demands of customers. For example, when integrating messaging application functionality into email programs, a greater amount of data in the form of notifications is required to flow constantly from the communications server to the client in a nearly realtime environment. Presence information, request/responses for chat, notification of changes in buddy lists, etc., are examples of data that needs to be readily processed by the server. On the other hand, it is mandatory that the messaging functionality does not compromise nonfunctional requirements such as scalability and performance.

To provide this information delivery capability, two different paradigms that can be employed are a push paradigm or a pull paradigm. In a typical client/server model, a client requests a service or information from the server and the server responds by transmitting the information to the client. This is called a pull technology, in that the client pulls information from the server. In contrast, in push technology, the request for a given transaction originates with the server.

Continuing with the example of messaging applications, messaging demands a fast client communication for meeting the demands of an acceptable amount of time for clients to receive a messaging chat notifications coming from other clients. Given this stringent requirement, the use of pull technology is not an attractive solution because it is not scalable and performance inhibited—with small intervals between requests, the number of pulling requests per second is too large to support many users per server.

Although the push model should be the clear choice, the push model presents complications such as increased memory consumption as well as the CPU overhead. Another issue is the implementation of a proxy server between the server and client which closes a connection that has been inactive for an extended period of time.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides for a rich user experience, performance, and scalability in a server push model for client/server communications. The push architecture operates on top of a non-push (e.g., request/response) protocol (e.g., HTTP) to combine notifications from multiple data sources (e.g., email, text messaging, etc.). The server can be a middle-tier server (or proxy) to which a single web client registers interest in one or more notification types from one or more data sources. The mid-tier server aggregates the notifications from the various data sources and delivers the notifications to the requesting client via a single "push" pipe. The web client then distributes each notification to the appropriate parts of the client user interface.

The architecture includes a producer/consumer locking mechanism that does not result in blocking threads waiting on a mutual exclusion lock. Thus, the push notification pipe that is scalable because the pipe does not use the thread wait mechanism that is implemented by the operating system.

The architecture also employs a notification throttling mechanism that distinguishes different types of notifications in order to guarantee that the client is not overloaded with too much information.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
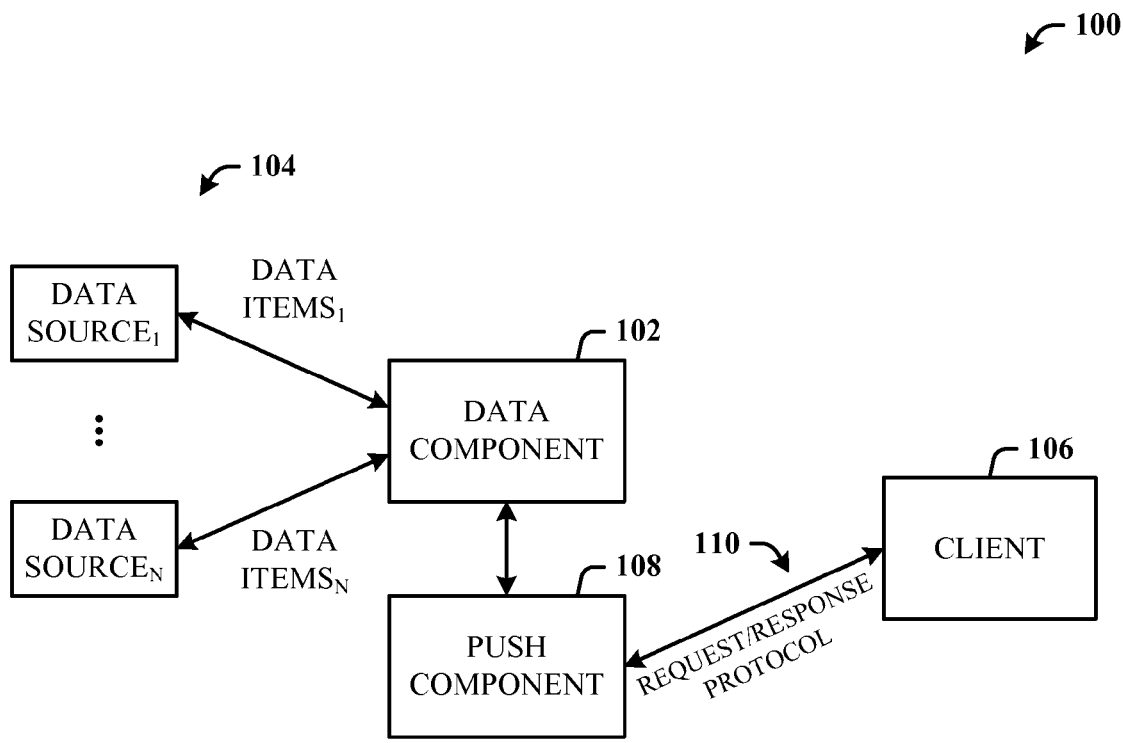
FIG. 1 illustrates a computer-implemented data communication system employing a server push architecture.

The disclosed architecture employs a push mechanism over typically a non-push request/response protocol (e.g., HTTP) to send data items from multiple data sources to a client. The data items can include messages and/or documents. The push mechanism is performant in that data communications between a server and multiple clients (whether on the same or different machines) occur in a timely and efficient manner. For example, where the data sources are mail servers, messaging servers, office servers, etc., the data items can be in the form of message notifications that are aggregated for communications to the corresponding clients. This provides efficient support for text messaging and email messaging that can demand relatively realtime communications. The push mechanism also includes a component for throttling the data items according to data types and priorities so that data items immediately needed will be sent over items that are not immediately needed to reduce the chance of data overflow at the client or the communication of useless data. In support thereof, a client registers with the server to indicate to the server the different data types the client expects to receive. The server sends separate commands to the clients for each one of the type of data sources currently employed. For example, a phone account will have a specific command, text messaging another command, and so on.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented data communication system 100 employing a server push architecture. The server push model initiates communications to the client. The system 100 includes a data component 102 for receiving and aggregating data items from multiple data sources 104 for transmission to a client 106 to which the data items are directed, and a push component 108 for establishing a communications pipe 110 based on a request/response protocol and pushing the aggregated data items to the client 106 via the communications pipe 110.

The data sources 104 can include web collaboration servers, email servers, messaging servers, etc., some or all of which can provide data items to the client 106 in response to a client request.

Figure 2:
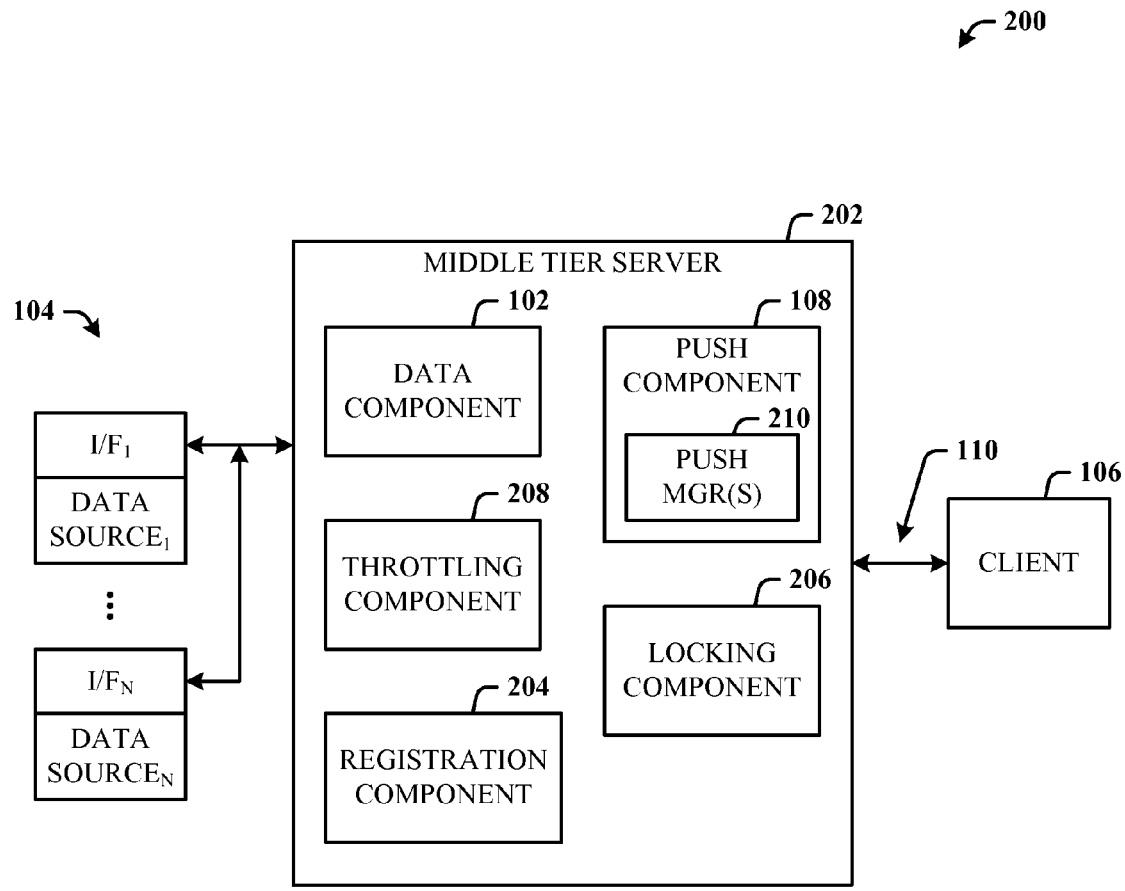
FIG. 2 illustrates an alternative computer-implemented data communication system employing a server push architecture.

FIG. 2 illustrates an alternative computer-implemented data communication system 200 employing a server push architecture. The system 200 includes the data component 102 for receiving and aggregating data items from the multiple data sources 104 for transmission to the client 106 to which the data items are directed, and the push component 108 for establishing the communications pipe 110 based on a request/response protocol and pushing the aggregated data items to the client 106 via the communications pipe 110.

Here, the data component 102 and push component 108 are employed in a centralized system, for example, a middle-tier (mid-tier) server 202. The server 202 also includes a registration component 204 for registering the client 106 for the types of the data items (e.g., message notifications) the client 106 should receive. The client 106 registers the type of application the client 106 is running and thus, should receive data items suitable only for these applications. Each client connected to the mid-tier server 202 registers to mid-tier server 202 via the registration component 204 for the various types of data expected to be received by that client. Moreover, the data items for each of the different client applications can be tagged with unique identifiers so that only data items for a given application will be sent to that application.

Thus, in the context of notifications as the data items, the data component 102 combines (aggregates) notifications from multiple data sources or a single data source, and seamlessly integrates other server components as notifications from other sources are used. The mid-tier server proxies the data items for each client for delivery to the appropriate client via a single client pipe. The client then distributes each data item (e.g., notification) to the appropriate parts of the client (e.g., a user interface).

The mid-tier system 202 can also include a locking component 206 for managing threads by processing the data items of incoming threads (thread waiting or trying to obtain lock for exclusive access to and use of the push pipe 110) via a holding thread (that holds lock to the communications push pipe 110) and a throttling component 208 for managing push of the data items via the communications pipe 110 based on item classification by a data source. The server push pipe 110 is a shared resource that can be used by only one thread at a time, in a classic mutual exclusion scenario.

A common way to guarantee mutual exclusion is through the use of monitors or semaphores. However, the problem with these solutions is that the lock state in this case would be very "hot"—many threads trying to get the lock at the same time in a matter of a few seconds and therefore impacting the performance of the system with many thread waits, thread context switches, and user-mode to kernel-mode transitions, etc.

To avoid this performance bottle-neck, the mid-tier 202 employs the locking component 206 (a producer/consumer mechanism) that does not result in blocking threads waiting on a mutual exclusion lock. Instead, if the lock is held by the holding thread, the acquiring thread notifies the holding thread that the acquiring thread has work to be consumed, and then the acquiring thread exits. The holding thread will, in turn, drain the work queue owned by the acquiring thread. This way, no threads are ever blocked in a wait state.

In one implementation, the push pipe 110 for pushing data items (e.g., web client notifications that can demand realtime or near realtime communications) is accomplished using on top of the non-push request/response HTTP protocol. Since HTTP by definition is not a push model protocol, the server push is emulated over HTTP so that the server 202 is able to push data to the client (e.g., a browser) as and when new data is available on the server 202.

To combine multiple sources of notifications into one server push mechanism, the push component 108 employs one or more push managers 210, and instantiates one server push manager for each client session (e.g., web client) to coordinate the usage of the server push pipe 110 for multiple sessions and managers for multiple clients in communication with the data sources 104 via the server 202. Each of the data sources 104 (denoted DATA SOURCE$_1$, . . . , DATA SOURCE$_N$) implement corresponding interfaces (denoted I/F$_1$, . . . , I/F$_N$) that the manager calls to connect the data source(s) to that manager. From then on, each of the data sources 104 can be in one of two states: "ready" or "data available", as facilitated by the interfaces. Whenever state changes from "ready" to "data available", the corresponding push manager is signaled by the data source and is then responsible for picking up data to be sent to the client. The push manager and the data sources are independent components that interact through the defined interface in order to achieve low coupling and high cohesion.

In order to avoid overloading of the client 106 with too many data items (e.g., message notifications), the throttling component 208 engages at a point in time to control the throughput of the push pipe. The throttling component 208 differentiates data items that must be sent right away (e.g., text message requests) from data items that can wait a short period of time (e.g., a few seconds) to be sent (e.g., a new mail notification). In one implementation, each client classifies the type of data that is sent to that client into different categories, and each category is handled differently by the corresponding server push manager. Accordingly, some data items are sent immediately, while other data items are selected by the corresponding push manager after a certain amount of time has elapsed. Alternatively, each data source classifies each data item type according to the urgency with which the data item should be sent to the client 106.

Each data source can also implement combining of multiple data items. For example, notification data items of a messaging data source can be reduced to a fewer number of data items based on changes in state. In other words, in one example, text message presence data items that indicate changes from "online" to "away", and then from "away" to "offline" in a small amount of time can be combined at the data source such that only a change from "online" to "offline" is sent to the client.

A constraint related to the number of open connections for each process can be configured in the registry and set to defaults to a maximum (e.g., two opened HTTP connections per process) for the same domain name and the maximum of six opened HTTP connections for different domains. Since one of the connections will always be used as a "pipe" for the notifications, a second connection can be used as efficiently as possible such that the responses can be processed as quickly as possible.

Figure 3:
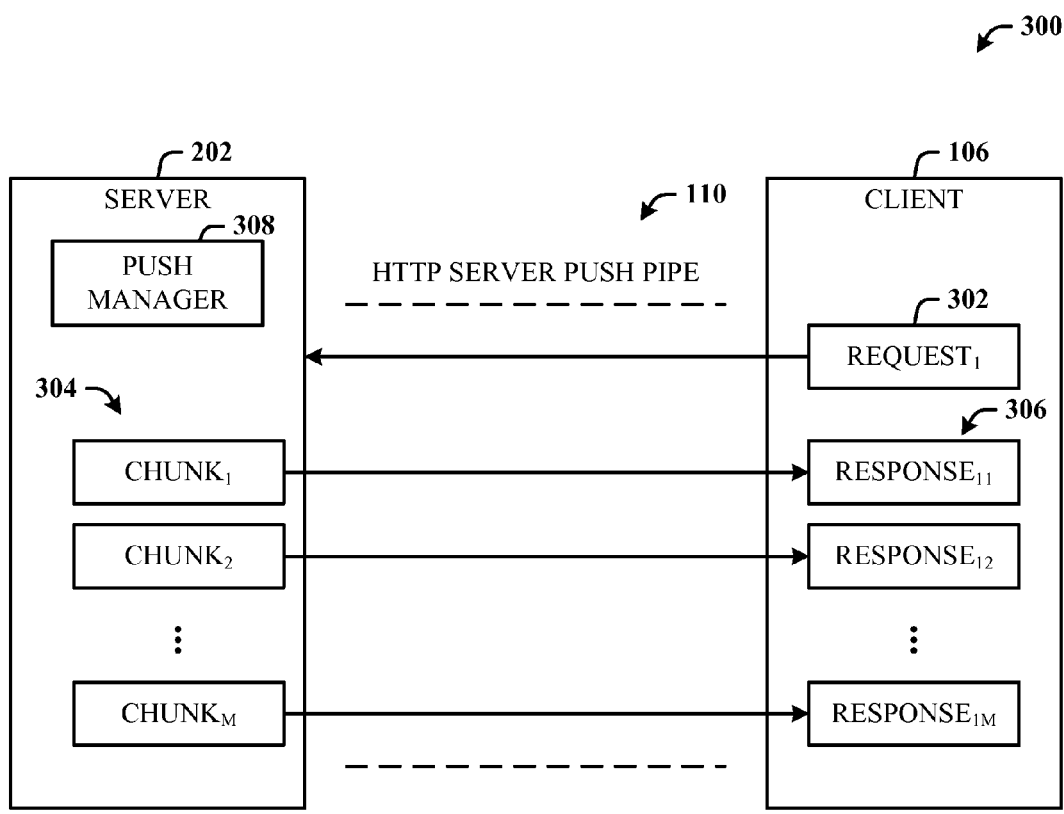
FIG. 3 illustrates a system that utilizes the transfer-encoding capabilities of the HTTP protocol to facilitate server push.

FIG. 3 illustrates a system 300 that utilizes the transfer-encoding capabilities of the HTTP protocol to facilitate server push. Providing server push on top of HTTP is accomplished using the transfer-encoding header. In an HTTP protocol definition, if the length of the response data package being transferred is unknown, it is possible to set the transfer-encoding header to "chunked" and add into each package a string (or size indicator) which defines the size of each chunk being sent.

The system 300 includes the server 202 and the client to which data items from data sources (not shown) are directed. After the user logon, the client 106 (e.g., web access application) sends a request 302 to the server 202, which request 302 serves as the push pipe 110 by facilitating multiple chunk response to the request. The request 302 is kept open so that the server 202 can send data items (e.g., notifications) as chunks 304 (denoted $CHUNK_1, \ldots, CHUNK_M$), which are interpreted by the client 106 as partial HTTP responses 306 (denoted $RESPONSE_{11}, \ldots, RESPONSE_{1M}$). Thus, it is possible to send many chunked responses 306 to the single request 302 such that the client 106 treats the responses 306 as individual response packets to be assembled as a larger response to the single request 302. However, in a disclosed implementation, the client code consumes the smaller chunks 304 as individual data item (e.g., notification) packets.

In one alternative implementation where the client is a browser, the browser allows JavaScript on the client to be called back whenever a chunk is received and retrieves/operates on these chunks. Instead of using an XmlHttpRequest, an invisible iframe is employed whose source points to the handler of the pending request on the server 202. Each response chunk 304 is sent enclosed in script tags; thus, the browser executes the script immediately after receiving the chunk. The hidden iframe is inside an active control so the browser will not show a "loading" icon on the page. It is to be appreciated that other suitable implementations can be employed other than using iframes or XmlHttpRequests yet maintain the push functionality of the disclosed architecture.

The server push model is centralized, which means that all the data items (e.g., notifications) are sent into the same push pipe 110 down to the client 106. A push manager instance 308 is instantiated for each session push pipe to coordinate usage of the push pipe 110 for a given client and the associated data items of a thread. A thread can include one or more data items, and there can be multiple threads for processing by the push manager 308 for pushing associated data items to the client 106. The pipe 110 is a resource that utilizes mutual exclusion while writing the threads of data items to the client 106; however, implementing mutual exclusion with traditional methods such as monitors and semaphores would incur an expensive cost. Therefore, the locking component of FIG. 2 guarantees the mutual exclusion and never puts the threads into a wait state. The holding thread that gets the pipe lock drains the work (the chunks) for the other acquiring threads. Thus, the locking mechanism of the push pipe 110 is scalable because the locking mechanism does not use the thread wait mechanism that is implemented by the operating system.

Figure 4:
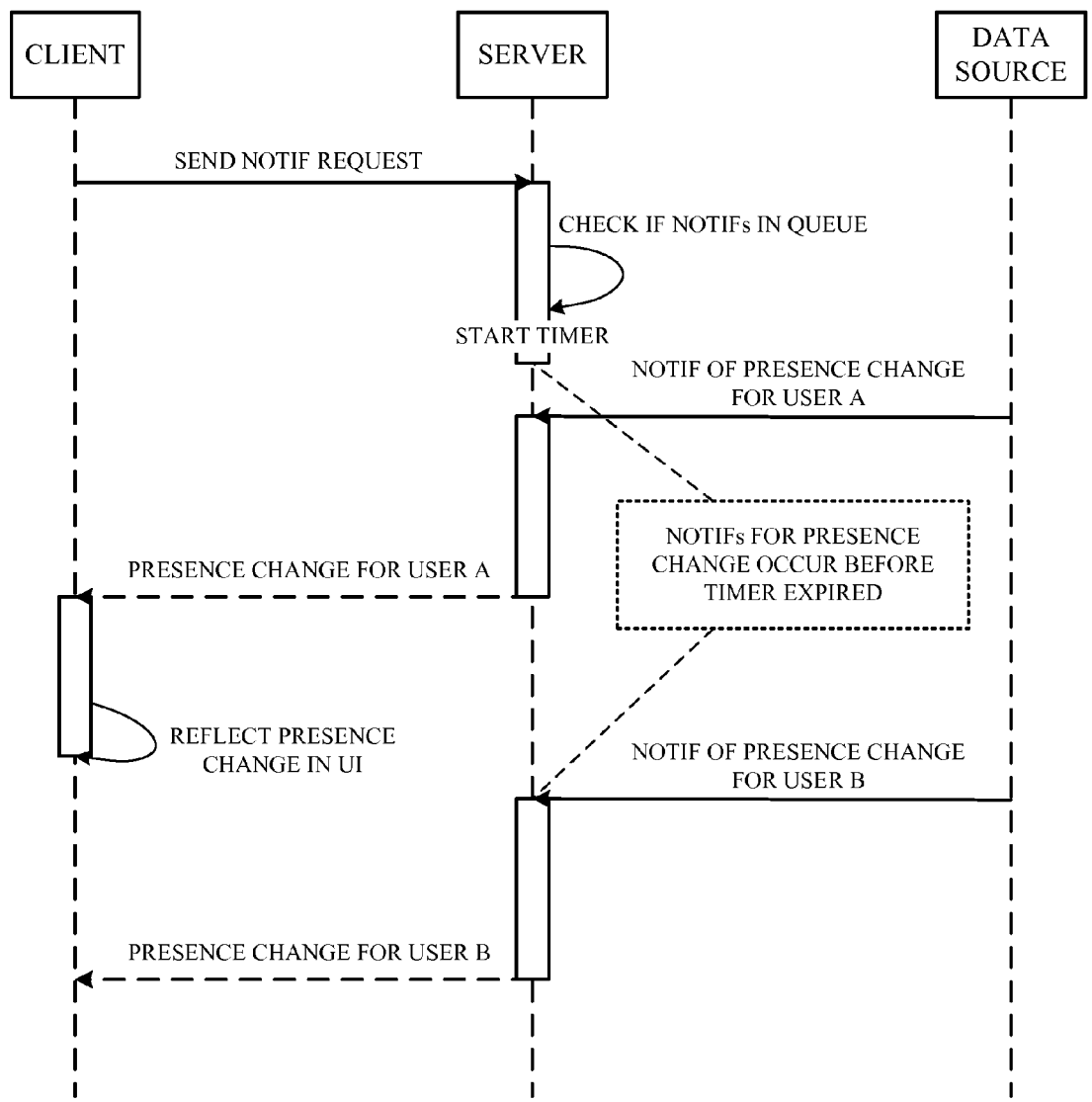
FIG. 4 illustrates a flow diagram in the context of text messaging and presence information and in accordance with the push communications.

FIG. 4 illustrates a flow diagram 400 in the context of text messaging and presence information and in accordance with the push communications. Here, the client sends a request to open the notification pipe with the server. The server then checks if any notifications have been enqueued and starts a timer. The data source sends a notification to the server of a change in user presence for a User A. The server sends the change for User A to the client. The client then reflects the change in user presence in the client UI. The data source then sends a change in presence for a User B to the server. The server sends the change for User B to the client, which is then reflected in the client UI. Note that the notifications for the presence change for both User A and User B occurred before the timer expired. Note also that the notifications for the changes in user presence for both User A and User B were processed in a single request, rather than a request for each change.

The client and server are configured to agree on the amount of time (e.g., minutes) the push pipe (the connection) will be open, so that corresponding timers can be reset. The order to finish the connection can come from the server, which sends the last package and demands the client to reset the timer. Both the client and the server have the capability to detect at a certain point if the connection was closed prematurely and take actions against the connection. Solutions can include the server sending a chunk of response periodically (e.g., every thirty seconds). Even if there is no notification to be send to the client, the server sends an alive packet response so the client, and the server then knows the connection is open and alive.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
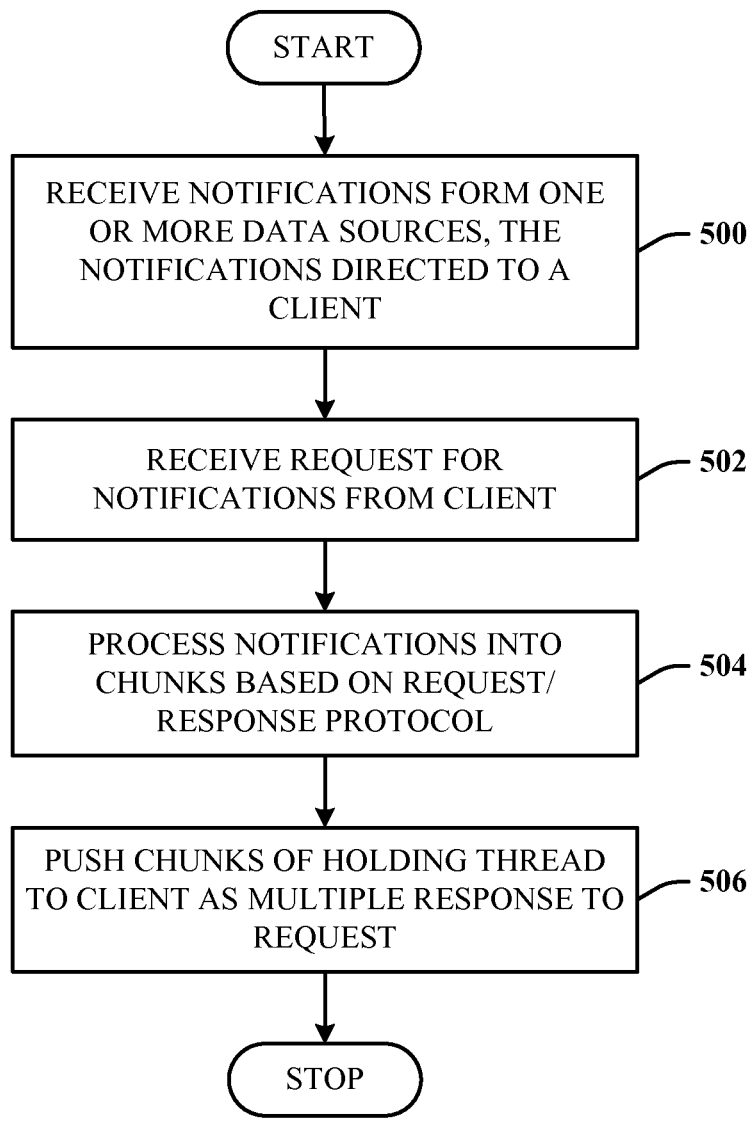
FIG. 5 illustrates a computer-implemented method of communicating data to a client.

FIG. 5 illustrates a computer-implemented method of communicating data to a client. At 500, notifications from one or more data sources are received, the notifications directed to a client. At 502, a request for the notifications is received from the client. At 504, the notifications are processed into chunks based on a request/response protocol (e.g., HTTP). At 506, the chunks of a holding thread are pushed to the client as multiple responses to the request.

Figure 6:
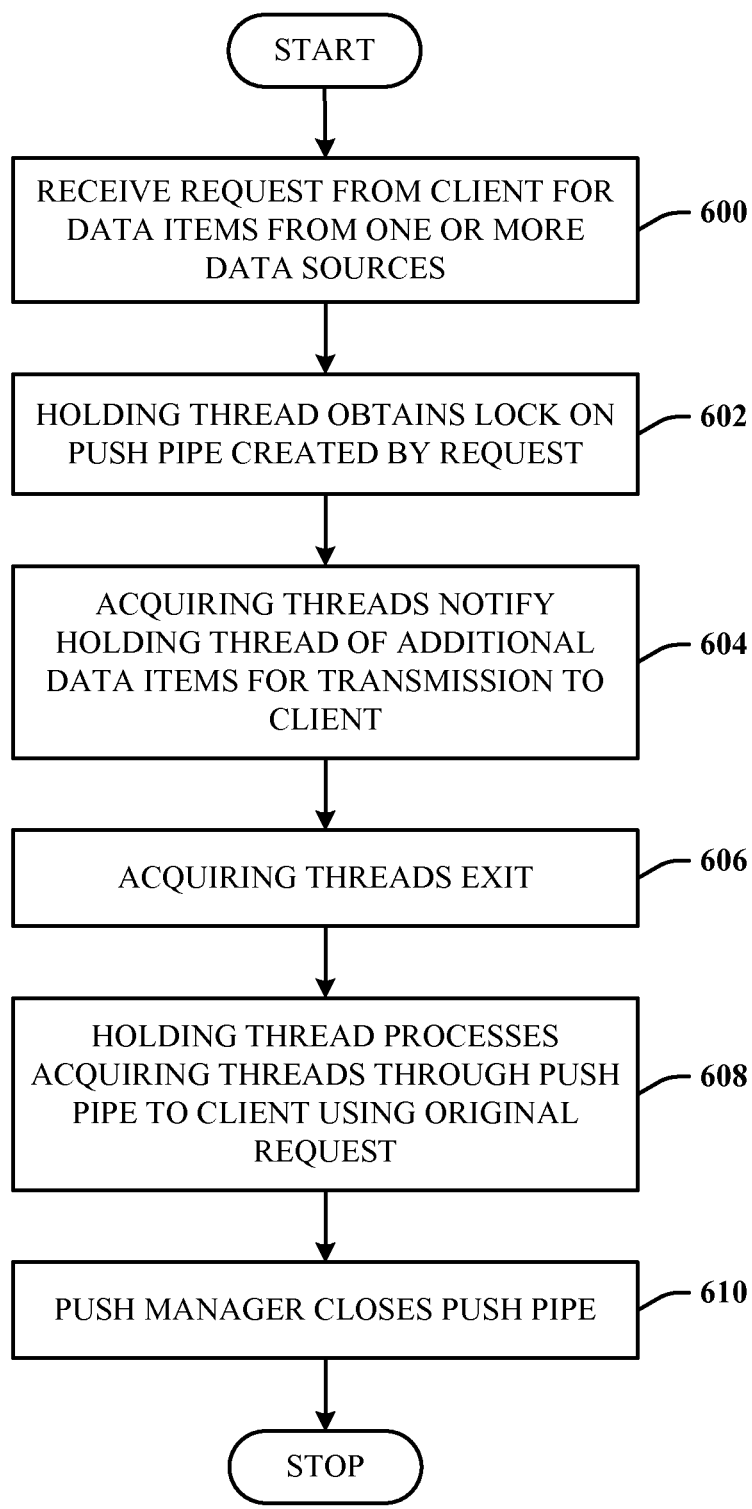
FIG. 6 illustrates a method of processing threads for communicating data items to a client.

FIG. 6 illustrates a method of processing threads for communicating data items to a client. At 600, a request for data items from one or more data sources is received from a client, the request received at a mid-tier server. The request serves as a push pipe through which the data items will be transmitted from the server to the client. At 602, a holding thread of the data items obtains lock on the push pipe. At 604, acquiring threads (threads seeking lock on the shared pipe and having other data items directed to the client) notify the holding thread of the additional data items for transmission to the client. At 606, the acquiring threads then exit. At 608, the holding thread processes the acquiring thread "jobs" by draining the chunk responses from the acquiring threads through the push pipe to the client based on the request.

Note that the acquiring threads can be prioritized according to criteria that push one acquiring thread before another acquiring thread. For example, if a second acquiring thread associated with text messaging notifications is queued after a first acquiring thread (based on first-in/first-out) that has email message notifications, the criteria can indicate that the second text messaging thread should be processed before the first email thread. Other criteria can be considered, such as if the user indicated "high priority" on an email message, for example, then the first acquiring thread could be processed before the second acquiring thread. At 610, once the threads are drained, the push pipe closes.

Figure 7:
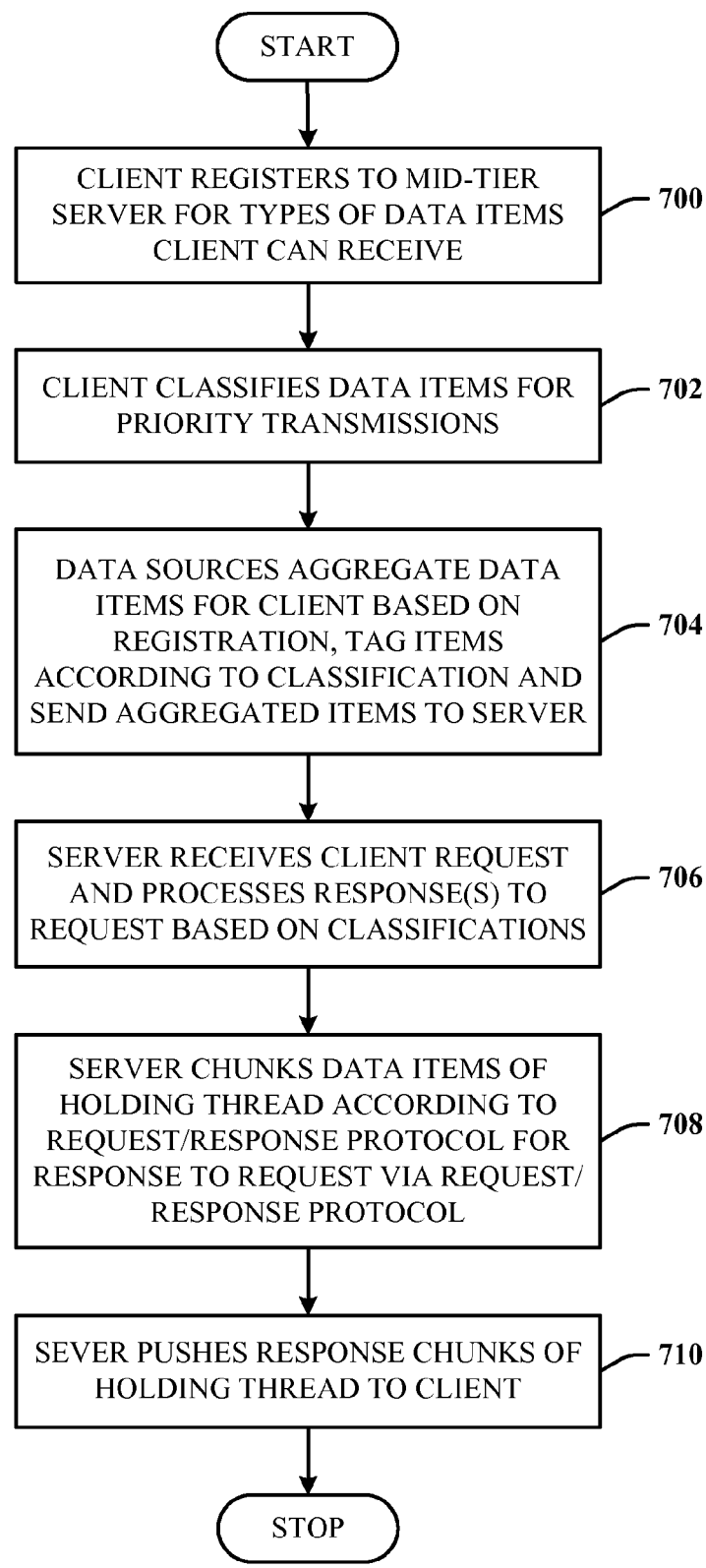
FIG. 7 illustrates a method of throttling thread chunk responses based on data item classification.

FIG. 7 illustrates a method of throttling thread chunk responses based on data item classification. At 700, the client registers with mid-tier server for the types of data items the client can receive. At 702, the client classifies the data items for priority transmission. At 704, the data sources aggregate data items for the client based on the registration, tag the aggregated items according to the classification, and send the aggregate data items to the server. At 706, the server receives a client request and processes the response(s) to the request based on the classifications. At 708, the server chunks the data items of a holding thread according to a request/response protocol for response to the request via the request/response protocol. At 710, the server pushes the response chunks of the holding thread to the client.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
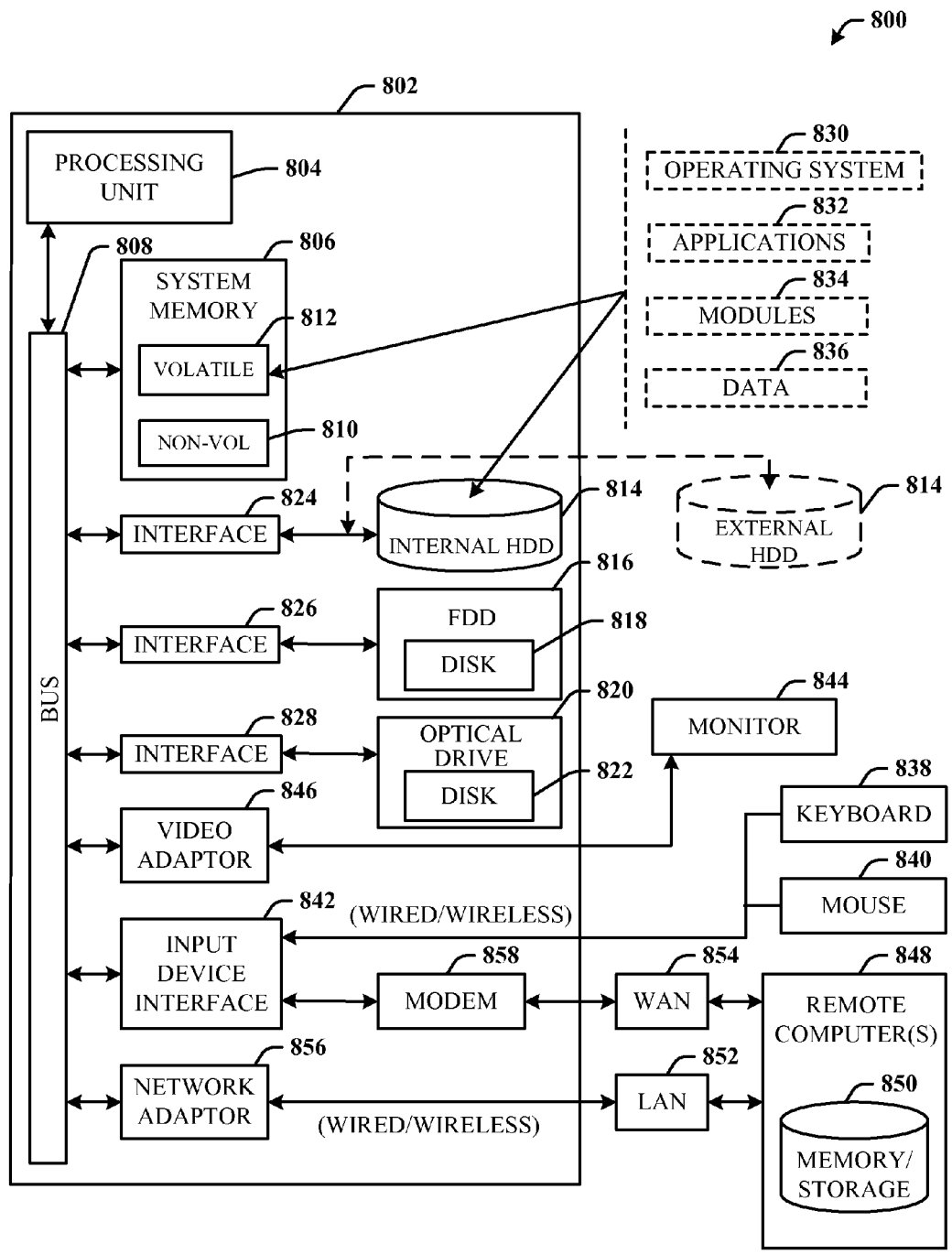
FIG. 8 illustrates a block diagram of a computing system operable to execute client/server push over a request/response protocol according to the disclosed architecture.

Referring now to FIG. 8, there is illustrated a block diagram of a computing system 800 operable to execute client/server push over a request/response protocol according to the disclosed architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802 having a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 can include non-volatile memory (NON-VOL) 810 and/or volatile memory 812 (e.g., random access memory (RAM)). A basic input/output system (BIOS) can be stored in the non-volatile memory 810 (e.g., ROM, EPROM, EEPROM, etc.), which BIOS are the basic routines that help to transfer information between elements within the computer 802, such as during start-up. The volatile memory 812 can also include a high-speed RAM such as static RAM for caching data.

The computer 802 further includes an internal hard disk drive (HDD) 814 (e.g., EIDE, SATA), which internal HDD 814 may also be configured for external use in a suitable chassis, a magnetic floppy disk drive (FDD) 816, (e.g., to read from or write to a removable diskette 818) and an optical disk drive 820, (e.g., reading a CD-ROM disk 822 or, to read from or write to other high capacity optical media such as a DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 812, including an operating system 830, one or more application programs 832, other program modules 834, and program data 836. The one or more application programs 832, other program modules 834, and program data 836 can include the data component 102, client 106 (e.g., browser), push component 108, request 302 and response chunks 306, where the computing system 802 is a client machine. Where the computing system 802 is embodied as a server machine, a server on the server machine can include the data component 102, the push component 108, the registration component 204, the locking component 206, push manager(s) 210, the throttling component 208, push manager 308, and chunks 304, for example.

All or portions of the operating system, applications, modules, and/or data can also be cached in the volatile memory 812. It is to be appreciated that the disclosed architecture can be implemented with various commercially available operating systems or combinations of operating systems.

A user can enter commands and information into the computer 802 through one or more wire/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, etc.

A monitor 844 or other type of display device is also connected to the system bus 808 via an interface, such as a video adaptor 846. In addition to the monitor 844, a computer typically includes other peripheral output devices (not shown), such as speakers, printers, etc.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, is connected to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 9:
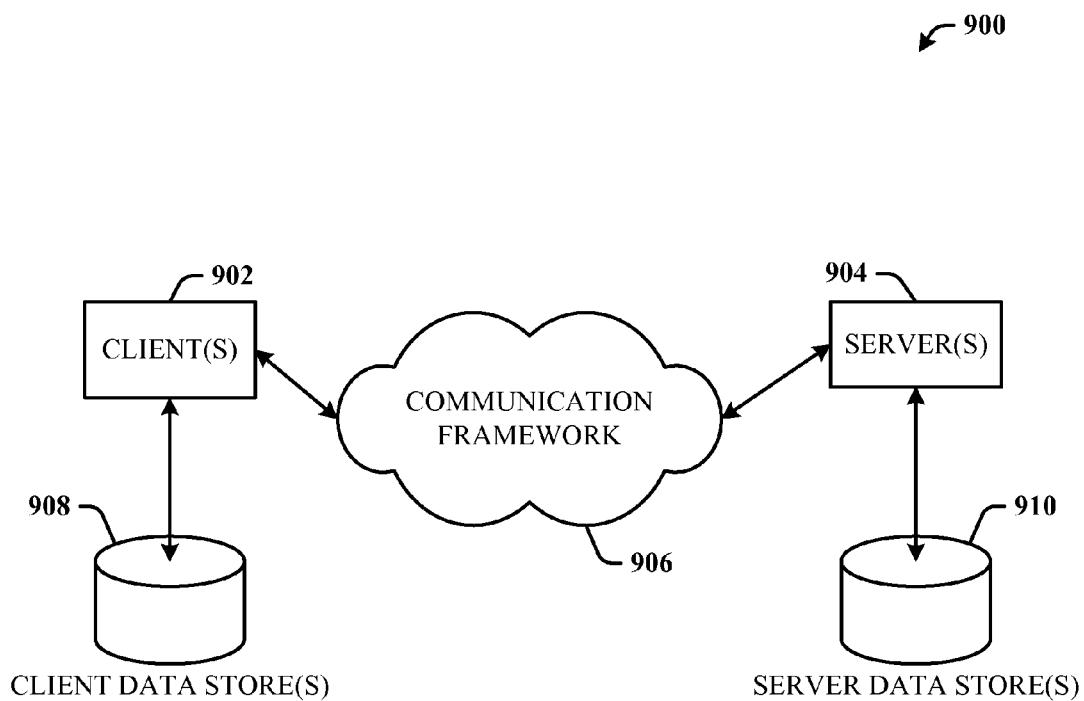
FIG. 9 illustrates a schematic block diagram of an exemplary computing environment for client/server push over a request/response protocol according to the disclosed architecture.

Referring now to FIG. 9, there is illustrated a schematic block diagram of an exemplary computing environment 900 for client/server push over a request/response protocol according to the disclosed architecture. The environment 900 includes one or more client(s) 902. The client(s) 902 can be hardware and/or software (e.g., threads, processes, computing devices). The client(s) 902 can house cookie(s) and/or associated contextual information, for example.

The environment 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The environment 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The client(s) 902 can include the client 106, and the server(s) 904 can include the data sources 104, the data component 102, the push component 108, the mid-tier server 202, the push manager 308, and the chunks 304.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method comprising:
    transmitting, by a client to a server, a single request for notifications based on a request/response protocol, wherein the server is configured to receive different types of notifications for the client from multiple data sources;
    connecting to the server via a communications pipe opened by the server in response to the single request for notifications;
    receiving aggregated notifications pushed by the server via the communications pipe as chunks of a holding thread, wherein the holding thread obtains exclusive use of the communications pipe for pushing the chunks of the holding thread to the client, locks out acquiring threads seeking use of the communications pipe to transmit notifications for the client included in the acquiring threads, and drains the notifications for the client from the acquiring threads through the communications pipe as chunks of the holding thread;
    interpreting, by the client, the chunks of the holding thread as multiple responses to the single request for notifications; and
    distributing the aggregated notifications to a user interface.

2. The method of claim 1, wherein the client is a browser application implemented by a wireless device.

3. The method of claim 1, wherein:
    the single request for notifications is a Hypertext Transfer Protocol (HTTP) request, and
    the chunks are interpreted by the client as partial HTTP responses to the HTTP request.

4. The method of claim 1, wherein the aggregated notifications include text messaging notifications and email notifications.

5. The method of claim 1, wherein each acquiring thread notifies the holding thread of one or more notifications for the client and then exits.

6. The method of claim 1, wherein the holding thread prioritizes the acquiring threads and processes the notifications for the client from the acquiring threads based on priority.

7. The method of claim 1, wherein different types of notifications for the client are throttled based on classifications of the different types of notifications for the client.

8. The method of claim 1, wherein each chunk of the holding thread is enclosed in script tags.

9. A computing device comprising:
    a processor configured to execute computer-executable instructions; and
    memory storing computer-executable instructions for:
        transmitting, by a client to a server, a single request for notifications based on a request/response protocol, wherein the server is configured to receive different types of notifications for the client from multiple data sources;
        connecting to the server via a communications pipe opened by the server in response to the single request for notifications;
        receiving aggregated notifications pushed by the server via the communications pipe as chunks of a holding thread, wherein the holding thread obtains exclusive use of the communications pipe for pushing the chunks of the holding thread to the client, locks out acquiring threads seeking use of the communications pipe to transmit notifications for the client included in the acquiring threads, and drains the notifications for the client from the acquiring threads through the communications pipe as chunks of the holding thread;
        interpreting, by the client, the chunks of the holding thread as multiple responses to the single request for notifications; and
        distributing the aggregated notifications to a user interface.

10. The computing device of claim 9, wherein:
    the client is a browser application, and
    the single request is wirelessly transmitted to the server.

11. The computing device of claim 9, wherein:
    the single request for notifications is a Hypertext Transfer Protocol (HTTP) request, and
    the chunks are interpreted by the client as partial HTTP responses to the HTTP request.

12. The computing device of claim 9, wherein the aggregated notifications include text messaging notifications and email notifications.

13. The computing device of claim 9, wherein different types of notifications included in the aggregated notifications are pushed to the client based on priority.

14. The computing device of claim 9, wherein each chunk of the holding thread is enclosed in script tags.

15. A computer-readable storage medium not consisting of a signal, the computer-readable storage medium storing computer-executable instructions, the computer-executable instructions, when executed, causing a computing device to perform steps comprising:
    transmitting, by a client to a server, a single request for notifications based on a request/response protocol, wherein the server is configured to receive different types of notifications for the client from multiple data sources;
    connecting to the server via a communications pipe opened by the server in response to the single request for notifications;
    receiving aggregated notifications pushed by the server via the communications pipe as chunks of a holding thread, wherein the holding thread obtains exclusive use of the communications pipe for pushing the chunks of the holding thread to the client, locks out acquiring threads seeking use of the communications pipe to transmit notifications for the client included in the acquiring threads, and drains the notifications for the client from the acquiring threads through the communications pipe as chunks of the holding thread;
    interpreting, by the client, the chunks of the holding thread as multiple responses to the single request for notifications; and
    distributing the aggregated notifications to a user interface.

16. The computer-readable storage medium of claim 15, wherein:
    the client is a browser application, and
    the single request is wirelessly transmitted to the server.

17. The computer-readable storage medium of claim 15, wherein:
   the single request for notifications is a Hypertext Transfer Protocol (HTTP) request, and
   the chunks are interpreted by the client as partial HTTP responses to the HTTP request.

18. The computer-readable storage medium of claim 15, wherein the aggregated notifications include text messaging notifications and email notifications.

19. The computer-readable storage medium of claim 15, wherein different types of notifications included in the aggregated notifications are pushed to the client based on priority.

20. The computer-readable storage medium of claim 15, wherein each chunk of the holding thread is enclosed in script tags.

* * * * *